United States Patent [19]

Berecz

[11] Patent Number: 4,687,396

[45] Date of Patent: Aug. 18, 1987

[54] ONE-PIECE COMPOSITE RIVET WITH DEFORMABLE HEAD PORTION AND MANDREL

[75] Inventor: Imre Berecz, El Toro, Calif.

[73] Assignee: Microdot Inc., Darien, Conn.

[21] Appl. No.: 738,959

[22] Filed: May 29, 1985

[51] Int. Cl.$^4$ .............................................. F16B 19/08
[52] U.S. Cl. .................................. 411/503; 411/377;
411/908; 264/33; 264/32
[58] Field of Search ............... 411/361, 377, 501, 503,
411/508, 509, 900–903, 907, 908; 264/32, 33

[56] References Cited

U.S. PATENT DOCUMENTS

| | | | |
|---|---|---|---|
| 3,354,260 | 11/1967 | Brandt et al. | 411/909 X |
| 3,544,143 | 12/1970 | Ohlsson | 411/501 X |
| 4,143,580 | 3/1979 | Luhm | 411/45 |
| 4,230,017 | 10/1980 | Angelosanto | 411/361 X |
| 4,405,256 | 9/1983 | King, Jr. | 411/360 X |
| 4,478,543 | 10/1984 | Lyon | 411/908 X |
| 4,478,544 | 10/1984 | Strand | 411/908 X |

Primary Examiner—Peter A. Nelson
Attorney, Agent, or Firm—Lyman R. Lyon

[57] ABSTRACT

A composite rivet comprises an integral mandrel from which material is sheared to form a head on the blind side of a workpiece.

3 Claims, 4 Drawing Figures

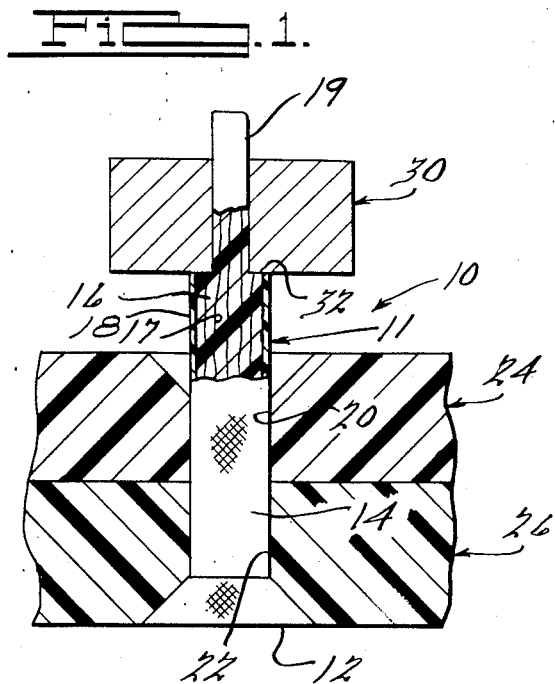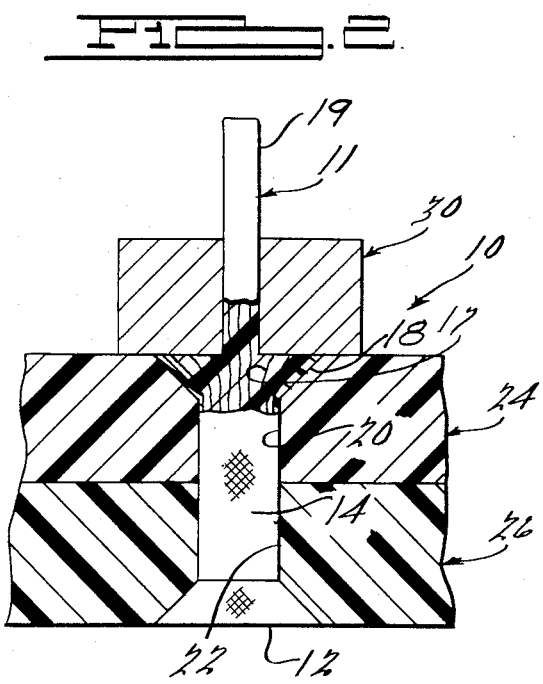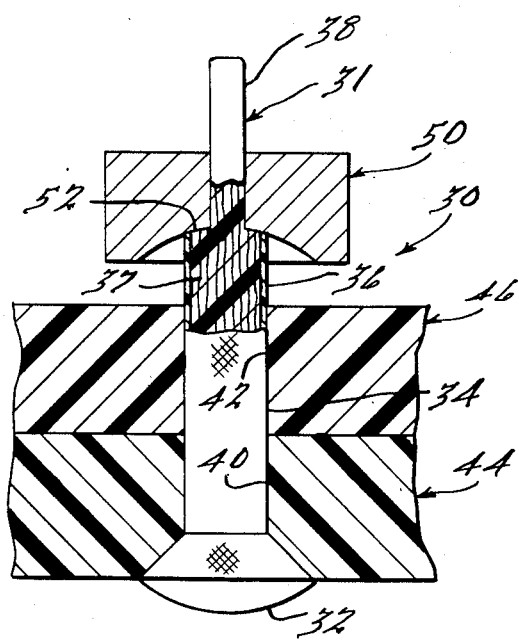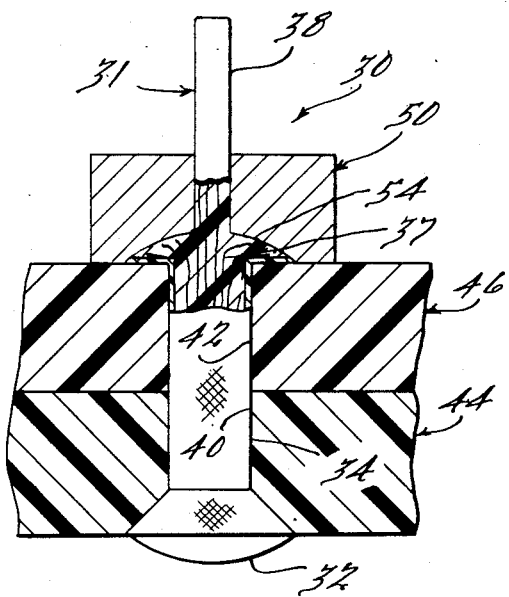

ONE-PIECE COMPOSITE RIVET WITH DEFORMABLE HEAD PORTION AND MANDREL

BACKGROUND OF THE INVENTION

The rivet of the instant invention is an improvement on the composite rivet disclosed in U.S. Pat. No. 4,478,544 issued Oct. 23, 1984, for Composite Rivet, and assigned to the assignee hereof.

Carbon fiber reinforced materials are now widely used in the aircraft industry for airframe structural components. However, one characteristic of composite materials utilizing carbon fibers is that the carbon fibers are difficult to reform. Thus, the use of carbon fiber reinforced resins in rivets has heretofore been limited by the difficulty of efficiently forming the rivet heads.

SUMMARY OF THE INVENTION

The aforesaid problem is solved by the discovery that a rivet head can be formed by shearing the radially outermost carbon fibers and their encapsulating thermoset resin matrix from an integral mandrel that is tensioned relative to a workpiece. Shearing and compression of the fibers and resin matrix by a suitable tool is enabled by the use of a thermoplastic or "B"-stage thermoset resin matrix, which is softened due to the application of heat. A radially extending rivet head is formed that is integral with the shear portion of the rivet and which, when fully polymerized, forms a riveted connection that exhibits relatively high shear and tension strength.

BRIEF DESCRIPTION OF THE DRAWINGS

FIG. 1 is an elevational view, partially in cross section, of one embodiment of the rivet of the instant invention;

FIG. 2 is a view of the rivet of FIG. 1 after advancement of a forming tool concurrently with tensioning of the rivet mandrel to form a head on the installed rivet;

FIG. 3 is a view similar to FIG. 1 of another embodiment of the instant invention; and FIG. 4 is a view of the rivet of FIG. 3 after forming tool advancement and tensioning of the mandrel thereof to form a head on the installed rivet.

DETAILED DESCRIPTION OF THE PREFERRED EMBODIMENT OF THE INVENTION

As best seen in FIG. 1 of the drawings, a rivet 10 in accordance with a constructed embodiment of the instant invention comprises a "B"-stage thermoset resin preform 11 having a performed head portion 12, a shear portion 14, and a head forming portion 16. The preform 11 is reinforced by parallel carbon fibers 17 and by an external sheath 18 of would or braided Kevlar fibers encapsulated in the resin matrix.

An integral mandrel 19 is disposed centrally of the preform 11 at the upper end of the head forming portion 16 thereof to facilitate tensioning of the rivet 10. The shear portion 14 of the rivet 10 extends through complementary apertures 20 and 22 in a pair of workpieces 24 and 26, respectively.

As seen by comparing FIG. 1 with FIG. 2 of the drawings, the mandrel 18 of the rivet 10 is adapted to be pulled upwardly, after heating of the preform 11, by a tool (not shown) of conventional design while a tool 30 is concomitantly biased downwardly against a shoulder 32 on the head forming portion 16 of the rivet 10 resulting in shearing of material from the mandrel and deformation of head forming portion 16 of the rivet 10 into the flat headed configuration shown in FIG. 2.

In accordance with one feature of the instant invention, the head forming portion 16 of the rivet 10 is easily stripped or separated from the mandrel portion 19 thereof because the carbon fibers 28 are orientated parallel to one another and are separated from one another by the "B"-stage resin matrix which is softened by the application of heat by, for example, a hot air blast, preheat of the tool 30, preheat of the entire preform 11, or heating of the entire assembly in situ.

A relatively smooth exterior surface is developed on the reformed head forming portion 16 which also maintains a clamp-up force of the rivet 10 on the workpieces 24 and 26 in conjunction with the head 12 of the rivet 10.

As best seen in FIG. 3 of the drawings, a rivet 30 in accordance with a second embodiment of the instant invention comprises a "B"-stage thermoset resin preform 31 having a preformed head portion 32, a shear portion 34, and a head forming portion 36. The preform 31 is reinforced by parallel carbon fibers 37.

An integral mandrel 38 is disposed centrally of the preform 31 at the outer end of the head forming portion 36 to facilitate tensioning of the rivet 30. The shear portion 34 of the rivet 30 extends through complementary apertures 40 and 42 in a pair of workpieces 44 and 46, respectively.

As seen by comparing FIGS. 3 and 4 of the drawings, the mandrel 38 of the rivet 30 is pulled upwardly, after heating of the preform 31, by a tool (not shown) of conventional design while a tool 50 is biased downwardly against an annular shoulder 52 on the head forming portion 36 of the rivet 30 resulting in deformation of head forming portion 36 of the rivet 30 into the convex headed configuration shown in FIG. 4.

In accordance with the instant invention, the head forming portion 36 of the rivet 30 is easily sheared or separated from the mandrel portion 38 thereof because the carbon fibers 37 are orientated parallel to one another and are separated from one another by the "B"-stage resin matrix which is softened by the application of heat.

A relatively smooth exterior surface is developed on a reformed rivet head 54 which also maintains a clamp-up force on the workpieces 44 and 46.

While the preferred embodiment of the invention has been disclosed, it should be appreciated that the invention is susceptible of modification without departing from the scope of the following claims.

I claim:

1. A one-piece composite rivet comprising
   a preformed head portion,
   a shear portion adjacent to and integral with said head portion,
   a head forming portion adjacent to and integral with said shear portion,
   a mandrel adjacent to and integral with said head forming portion,
   said head forming portion being deformable to form a head on the opposite side of said shear portion from said preformed head, said formed head comprising material sheared from a radially outer portion of said mandrel whereby said mandrel extends therefrom after formation of said head.

2. A method of forming a one-piece composite rivet having a preformed head portion, a shear portion, a head forming portion, and a mandrel extending from said head forming portion comprising the steps of
assembling said rivet in a complementary aperture in a workpiece,
heating said head forming portion,
tensioning said mandrel in a direction away from the preformed head thereon, and
shearing a portion of said head forming portion from said mandrel, and
moving said sheared portion toward said preformed head to form an integral head against said workpiece.

3. The method of claim 2 wherein said head forming portion has a first diameter and said mandrel has a second diameter smaller than said first diameter comprising the steps of
telescoping a tool having an aperture complementary to said second diameter over said mandrel,
tensioning said mandrel away from said workpiece, and
biasing said tool toward said workpiece to shear the material of said head forming portion away from said mandrel.

* * * * *